US011983555B2

(12) United States Patent
Tsirkin et al.

(10) Patent No.: US 11,983,555 B2
(45) Date of Patent: May 14, 2024

(54) STORAGE SNAPSHOTS FOR NESTED VIRTUAL MACHINES

(71) Applicant: Red Hat, Inc., Raleigh, NC (US)

(72) Inventors: Michael Tsirkin, Ra'anana (IL); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 470 days.

(21) Appl. No.: 17/444,372

(22) Filed: Aug. 3, 2021

(65) Prior Publication Data
US 2023/0043929 A1 Feb. 9, 2023

(51) Int. Cl.
*G06F 9/455* (2018.01)
*G06F 16/11* (2019.01)

(52) U.S. Cl.
CPC ........ *G06F 9/45558* (2013.01); *G06F 16/128* (2019.01); *G06F 2009/4557* (2013.01)

(58) Field of Classification Search
CPC ......... G06F 9/45558; G06F 2009/4557; G06F 2009/45562; G06F 2009/45566; G06F 2009/45579; G06F 2009/45583; G06F 2009/45587
See application file for complete search history.

(56) References Cited

U.S. PATENT DOCUMENTS

| | | |
|---|---|---|
| 7,681,134 B1 * | 3/2010 | Grechishkin ....... G06F 9/45537 715/740 |
| 8,327,353 B2 | 12/2012 | Traut |
| 8,490,090 B2 | 7/2013 | Ben-Yehuda et al. |
| 8,819,647 B2 | 8/2014 | Mitran |
| 9,122,509 B2 | 9/2015 | Deng et al. |
| 9,176,767 B2 | 11/2015 | Cantu |
| 10,324,863 B2 | 6/2019 | Lemay |
| 10,437,627 B2 | 10/2019 | Hu |
| 10,467,033 B2 | 11/2019 | Tian et al. |
| 10,831,532 B2 | 11/2020 | Castet |
| 11,314,421 B2 * | 4/2022 | Aron ..................... G06F 3/0683 |

(Continued)

FOREIGN PATENT DOCUMENTS

CN     108920255     11/2018

OTHER PUBLICATIONS

Ben-Yehuda, Muli et al., "The Turtles Project: Design and Implementation of Nested Virtualization", 9th USENIX Symposium on Operating Systems Design and Implemenation, Oct. 4-6, 2010, Vancouver, BC, Canada, http://www.usenix.org/events/osdi10/tech/full_papers/Ben-yehuda.pdf, pp. 1-14.

(Continued)

*Primary Examiner* — Emerson C Puente
*Assistant Examiner* — Zhi Chen
(74) *Attorney, Agent, or Firm* — Womble Bond Dickinson (US) LLP (57) ABSTRACT

Systems and methods for storage snapshots for nested virtual machines. An example method may comprise running, by a host computer system, a hypervisor managing a first virtual machine associated with a first virtual device. Responsive to creating a second virtual machine by the hypervisor, requesting, by the first virtual machine, a first snapshot of the first virtual device. The hypervisor generates the first snapshot of the first virtual device and forwards the first snapshot of the first virtual device to the second virtual machine.

18 Claims, 6 Drawing Sheets

(56) References Cited

U.S. PATENT DOCUMENTS

| | | | | |
|---|---|---|---|---|
| 11,487,572 | B1* | 11/2022 | Sabin | H04L 67/10 |
| 2014/0019968 | A1* | 1/2014 | Deng | G06F 9/45558 |
| | | | | 718/1 |
| 2015/0074054 | A1* | 3/2015 | Antony | G06F 16/128 |
| | | | | 707/639 |
| 2015/0199343 | A1* | 7/2015 | Dabak | G06F 9/455 |
| | | | | 713/189 |
| 2015/0378762 | A1 | 12/2015 | Saladi et al. | |
| 2016/0085568 | A1 | 3/2016 | Dupre et al. | |
| 2016/0378527 | A1* | 12/2016 | Zamir | G06F 9/45558 |
| | | | | 711/162 |
| 2018/0181418 | A1 | 6/2018 | Elangovan et al. | |
| 2018/0260251 | A1* | 9/2018 | Beveridge | G06F 9/5027 |
| 2019/0087223 | A1 | 3/2019 | Bhandari et al. | |
| 2019/0108051 | A1 | 4/2019 | Wang et al. | |
| 2020/0065196 | A1* | 2/2020 | Desai | G06F 11/1484 |
| 2021/0406051 | A1* | 12/2021 | Tsirkin | G06F 21/602 |
| 2022/0035649 | A1* | 2/2022 | Tsirkin | G06F 12/0802 |
| 2022/0035905 | A1* | 2/2022 | Lu | G06F 21/53 |

OTHER PUBLICATIONS

Lim, J.T et al., "Optimizing Nested Virtualization Performance Using Direct Virtual Hardware", ACM ISBN 978-1-4503-7102-5/20/03, https://doi.org/10.1145/337373376.3378467, Session 7A: Virtualized environments—Take the blue pill, ASPLOS'20, Mar. 16-20, 2020, Lausanne, Switzerland, pp. 557-574.

Temelkova, Katerina, "Nested Virtualization and PCI Passthrough with KVM and OpenNebula", https://storpool.com/blog/nested-virtualization-with-kvm-and-opennebula, Nov. 26, 2019, 17 pages.

Kauer, Bernhard et al., "Recursive Virtual Machines for Advanced Security Mechansims", http://di.fc.ul.pt/~bessani/publications/dcdv11-recursivevm.pdf, Universidade de lisboa faculdade de Ciencias LaSIGE, 6 pages.

Amaral, Marcelo et al., "Performance Evaluation of Microservices Architectures using Containers", https://core.ac.uk/download/pdf/81578653.pdf, Technical University of Catalonia (UPC Barcelona Supercomputing Center (Bsc); IBM T. J. Watson Research Center, Yorktown Heights, NY, 2015 IEEE, 8 pages.

* cited by examiner

STORAGE SNAPSHOTS FOR NESTED VIRTUAL MACHINES

TECHNICAL FIELD

The present disclosure is generally related to virtualized computer systems, and more particularly, to storage snapshots for nested virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for storage snapshots for nested virtual machines. Examples of the present disclosure refer to virtual machines for simplicity. However, the disclosure may be applicable to other virtualized execution environment in place of a virtual machine.

A virtualized execution environment may be a virtual machine, a virtual container, a virtual OS, etc. A snapshot may be viewed as a storage function allowing creation of a copy or a restore point of a virtual device, a virtual machine's operating system, applications, and data at a certain point in time. A snapshot saves the data present in a virtual device at the time of the snapshot creation. The data may be saved as a read-only volume, thus allows for recovery as it existed at the time of the snapshot creation.

Certain processor architectures support virtualization by providing special instructions for facilitating virtual machine execution. In certain implementations, a processor may support executing a hypervisor (also referred to as "virtual machine monitor") that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources.

A transition from the reduced privilege level (also referred to as VMX non-root operation in certain processor architectures) to the hypervisor context is referred to as a VM exit and may be triggered by a VM attempting a memory access operation to a certain memory region, by the VM attempting to execute a certain privileged instruction, or by the VM invoking a special Instruction Set Architecture (ISA)-dependent instruction (e.g., VMCALL). A processor instructions (e.g., VMEnter/VMResume) may be implemented to transition (e.g., return) back to the unprivileged guest execution mode.

A virtual device is software configurations that emulates, simulates, or otherwise mimics the behavior of a physical hardware device (e.g., a Peripheral Component Interconnect (PCI) device, a network device, etc.), but does not necessarily have associated hardware or may share hardware resources with other virtual devices. Conversely, a virtual device that is created and implemented by a hypervisor, may be exposed to a virtual machine (VM) as a pass-through device, which is exclusively associated with a physical device (e.g., a network interface card). In an illustrative example, an I/O device associated with a virtual machine (e.g., a virtual network interface card) may be provided by a virtual function, thus bypassing the virtual networking on the host in order to reduce the latency between the virtual machine and the underlying physical network interface card. Accordingly, communications (e.g., access requests) may be sent directly from the VM to the pass-through (virtual) device whereby the hypervisor acts as a "pass-through" for the communications. Thus, with pass-through, the VM may access the virtual device without the hypervisor trapping the communications. To communicate (e.g., via an access request) with the virtual device, the VM may trigger a virtual machine exit (VMExit) event which results in the VM temporarily exiting to the hypervisor.

Nested virtualization refers to virtualization that runs inside an already virtualized environment. In nested virtualization, a first hypervisor (hereafter "Level 0 hypervisor") controls physical hardware resources (e.g., bare metal). One or more second hypervisors (hereafter "Level 1 hypervisor")

may run as virtual machine(s) managed by the Level 0 hypervisor. Each Level 1 hypervisor may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 is less privileged that Level 1). The Level 1 hypervisor may control execution of the Level 2 VM(s). For example, the Level 1 hypervisor may implement a firewall in software and prevent the Level 2 VM from communicating outside the Level 1 hypervisor.

In nested virtualization, a virtual device may be created and implemented by a nested hypervisor (e.g., the Level 1 hypervisor, a Level 2 hypervisor, etc.) and exposed to a VM (e.g., a Level 2 VM, a Level 3 VM, etc.) as a pass-through device. In current technologies, when a nested VM requests access to a virtual device implemented by a nested hypervisor, the access request first requires a VMExit to the Level 0 hypervisor, whereby the Level 0 hypervisor communicates with every level of the nested virtualized environment to translate the access request. This process uses additional processing resources (e.g., central processing unit (CPU) resources) and hinders performance.

Aspects of the present disclosure address the above-noted and other deficiencies by providing technology that reduces the I/O overhead for virtual devices within nested virtualized computer systems. In particular, aspects of the present disclosure provide technology that assigns a snapshot of a virtual device directly to a Level 2 virtual machine thus avoiding VM exits by Level 2 to Level 1 virtual machine. In an example, a host computer system may run a Level 0 hypervisor managing a Level 1 virtual machine which may manage a Level 2 virtual machine (VM). A virtual device may be generated by the Level 0 hypervisor and assigned to Level 1 virtual machine. When the Level 2 VM is created, Level 1 VM may request a snapshot of the virtual device to assign to a virtual device that is assigned to Level 2 VM. When the Level 2 VM performs an access request with respect to the virtual device, the Level 2 VM would perform VMExit directly to the Level 0 hypervisor to execute the storage operation, thus bypassing the Level 1 VM and therefore improving the overall I/O efficiency of the system.

Various aspects of the above referenced methods and systems are described in details herein below by way of examples, rather than by way of limitation. The examples provided below discuss a virtualized computer system where storage snapshot management may be initiated by aspects of a hypervisor, a host operating system, a virtual machine, or a combination thereof. In other examples, the storage snapshot management may be performed in a non-virtualized computer system that is absent a hypervisor or other virtualization features discussed below.

Figure 1:
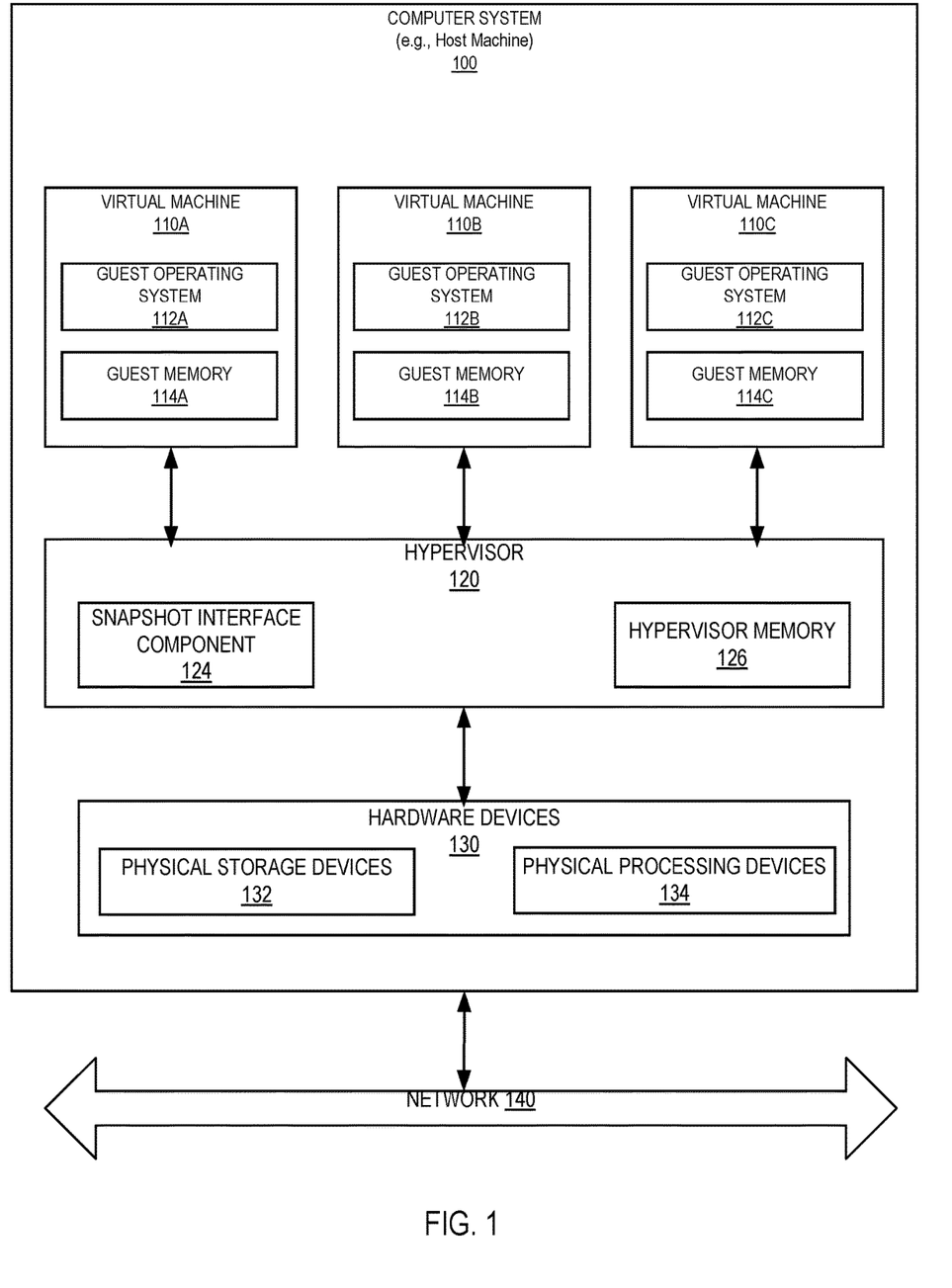
FIG. 1 depicts a high-level block diagram of an example host computer system that manages storage snapshots for virtual machines, in accordance with one or more aspects of the present disclosure.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems 112A-C that manage guest memory 114A-C respectively.

Guest memory 114A-C may be any virtual memory, logical memory, physical memory, other portion of memory, or a combination thereof for storing, organizing, or accessing data. Guest memory 114A-C may represent the portion of memory that is designated by hypervisor 120 for use by one or more respective virtual machines 110A-C. Guest memory 114A-C may be managed by guest operating system 112A-C and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. An application (not shown) of the guest operating system 112A-C may request access (e.g., read, write, etc.) to the data in the guest memory 114A-C. For example, the application may request to read or write files stored in a volume associated with hypervisor memory 126.

Hypervisor memory 126 (e.g., host memory) is managed by hypervisor 120. The memory allocated to guests may be a portion of hypervisor memory 126 that has been allocated by hypervisor 120 to virtual machines 110A-C and corresponds to guest memory of virtual machines 114A-C. Other portions of hypervisor memory may be allocated for use by hypervisor 120, a host operating system, hardware device, other module, or a combination thereof.

Hypervisor 120 may also be known as a virtual machine monitor (VMM) and may provide virtual machines 110A-C with access to one or more features of the underlying hardware devices 130. Hypervisor 120 may be a Level 0 hypervisor, thus having the highest level of privilege within the computer system 100. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include snapshot interface component 124 for providing snapshots of virtual devices to nested VMs.

The snapshot interface component 124 may generate a snapshot of a virtual device (e.g., guest memory 114A) and assign the snapshot of the virtual device to a virtual device of the nested virtual machine. The snapshot interface component 124 refers to a software component implemented by one or more software modules, each module associated with a set of executable instructions. Furthermore, designation of the snapshot interface component 124 is purely functional, i.e., snapshot interface component 124 may be an integral part of the executable code of hypervisor 120. In an example, the virtual machine 110A may request a nested VM to run within virtual machine 110A to be managed by virtual machine 110A. When creating the nested VM, for example, virtual machine 110A may request a snapshot of the virtual device of virtual machine 110A to be generated and assigned to a virtual device of the nested VM of virtual machine 110A. Hypervisor 120 may use the snapshot interface component 124 to generate the snapshot of guest memory 114A and assign the snapshot of guest memory 114A to a nested VM of virtual machine 110A. Accordingly, storage operations on the snapshot of guest memory 114A results in a VMExit to the hypervisor 120 to perform the storage operations, similar to storage performed on guest memory 114A.

The snapshot interface component 124 may generate a snapshot of a virtual device corresponding to at least a subset of physical storage devices 132 and provide the snapshot of the virtual device to virtual machine 110A. In an example, the virtual machine 110A may request a nested VM to be managed and run within virtual machine 110A. When creating the nested VM, virtual machine 110A may request a snapshot of the virtual device to be generated and assigned to the nested VM of virtual machine 110A. The hypervisor 120 based on the request generates to the snapshot of the virtual device and assigns it to the nested VM. Accordingly, storage operations on the first snapshot of virtual device results in a VMExit to the hypervisor 120 to perform the storage operations. In some embodiments, the snapshot interface component 124 may be manage the multiple snapshots generated by the snapshot interface component 124.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
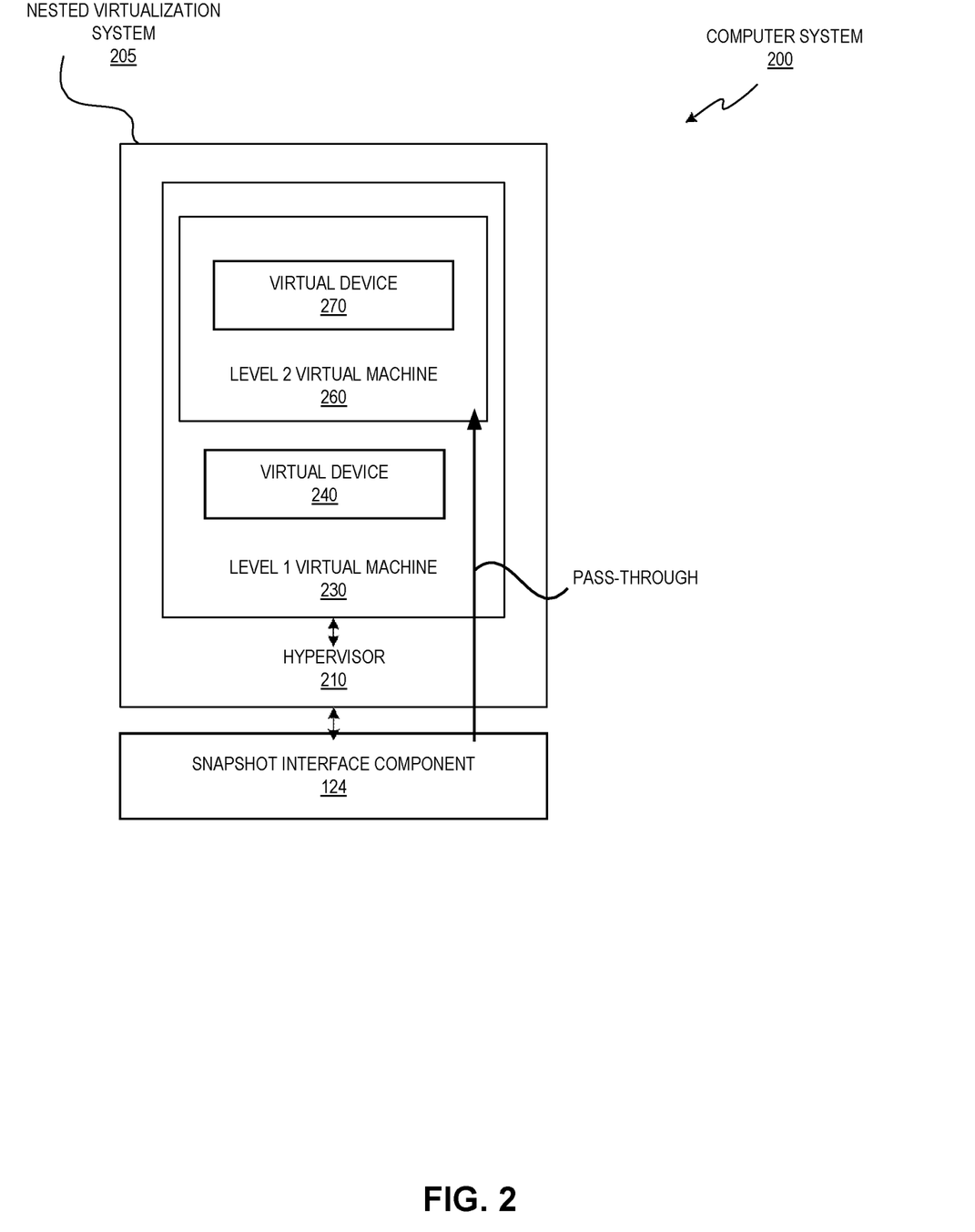
FIG. 2 depicts a block diagram illustrating components of an example nested virtualization computer system performing pass-through of a storage snapshot, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include nested virtualization system 205 and snapshot interface component 124.

Nested virtualization system 205 may include hypervisor 210, which may manage a Level 1 virtual machine 230. Level 1 virtual machine (Level 1 VM) 230 may manage a Level 2 virtual machine (Level 2 VM) 260.

Hypervisor 210 may create virtual device 240, which may be assigned to Level 1 VM 230. By way of example, Level 1 VM 230 may request the creations of Level 2 VM 260 from the hypervisor 210 to be managed by Level 1 VM 230. When Level 2 VM 260 is created by the hypervisor 210, Level 1 VM 230 sends a request to hypervisor 210 to generate a snapshot of virtual device 240 to be assigned to Level 2 VM 260. In response to receiving the request from Level 1 VM 230 at hypervisor 210, the snapshot interface component 124 may enable the computer system 200 to generate the snapshot of virtual device 240. Once the snapshot of virtual device 240 is generated, snapshot interface component 124 performs a pass-through of the generated snapshot of virtual device 240 to the virtual device 270 of Level 2 VM 260 and assigns the generated snapshot of virtual device 240 to virtual device 270. Depending on the embodiment, hypervisor 210 may enable the snapshot interface component 124 to generate as many snapshots of virtual device 240 that Level 1 VM 230 requests for Level 2 VM 260. Accordingly, virtual device 240 is associated with Level 1 VM 230 and virtual device 270 is associated to Level 2 VM 260 which is a snapshot of virtual device 240, whereby access request on virtual device 270 resembles access request on virtual device 240.

By way of example, responsive to an access request (e.g., write) on virtual device 270, a VMExit is triggered and Level 2 VM 260 temporarily exits to hypervisor 210. Hypervisor 210 may processes the access request (e.g., write) and then return (e.g., trigger VMResume) to Level 2 VM 260. In some embodiments, responsive to processing the access request by hypervisor 210, snapshot interface component 124 may generate a snapshot of virtual device 240 to be assigned to virtual device 270. Similarly, responsive to an access request (e.g., write) on virtual device 240, a VMExit is triggered and Level 1 VM 230 temporarily exits to hypervisor 210. Hypervisor 210 may processes the access request (e.g., write) and then return (e.g., trigger VMEnter) to Level 1 VM 230.

In some embodiments, the snapshot interface 124 may generate snapshots of the a virtual device from physical storage to be assigned to virtual device 240 of Level 1 VM 230 and virtual device 270 of Level 2 VM 260. By way of example, responsive to an access request (e.g., write) on virtual device 270, a VMExit is triggered and Level 2 VM 260 temporarily exits to hypervisor 210. Hypervisor 210 detects which of Level 1 VM 230 or Level 2 VM 260 as performed the access request. Responsive to a determination as to which of Level 1 VM 230 or Level 2 VM 260 performed the access request (e.g., Level 2 VM 260), the snapshot interface component 124 may perform a copy on write operation on the virtual device from physical storage. Copy on write operations refer to performing a snapshot of the virtual device from physical storage and performing a write operation on the snapshot of the virtual device from physical storage, accordingly, virtual device from physical storage remains unchanged and the snapshot of the virtual device from physical storage is modified to correct the copy based on the write operation. When the copy on write is performed, the snapshot of the virtual device from physical storage is passed through and assigned to virtual device 270. Similarly, responsive to a determination that Level 1 VM 230 performed the access request the snapshot interface component 124 may perform a copy on write operation on the virtual device from physical storage. When the copy on write is performed, the snapshot of the virtual device from physical storage is passed through and assigned to virtual device 240.

Figure 3:
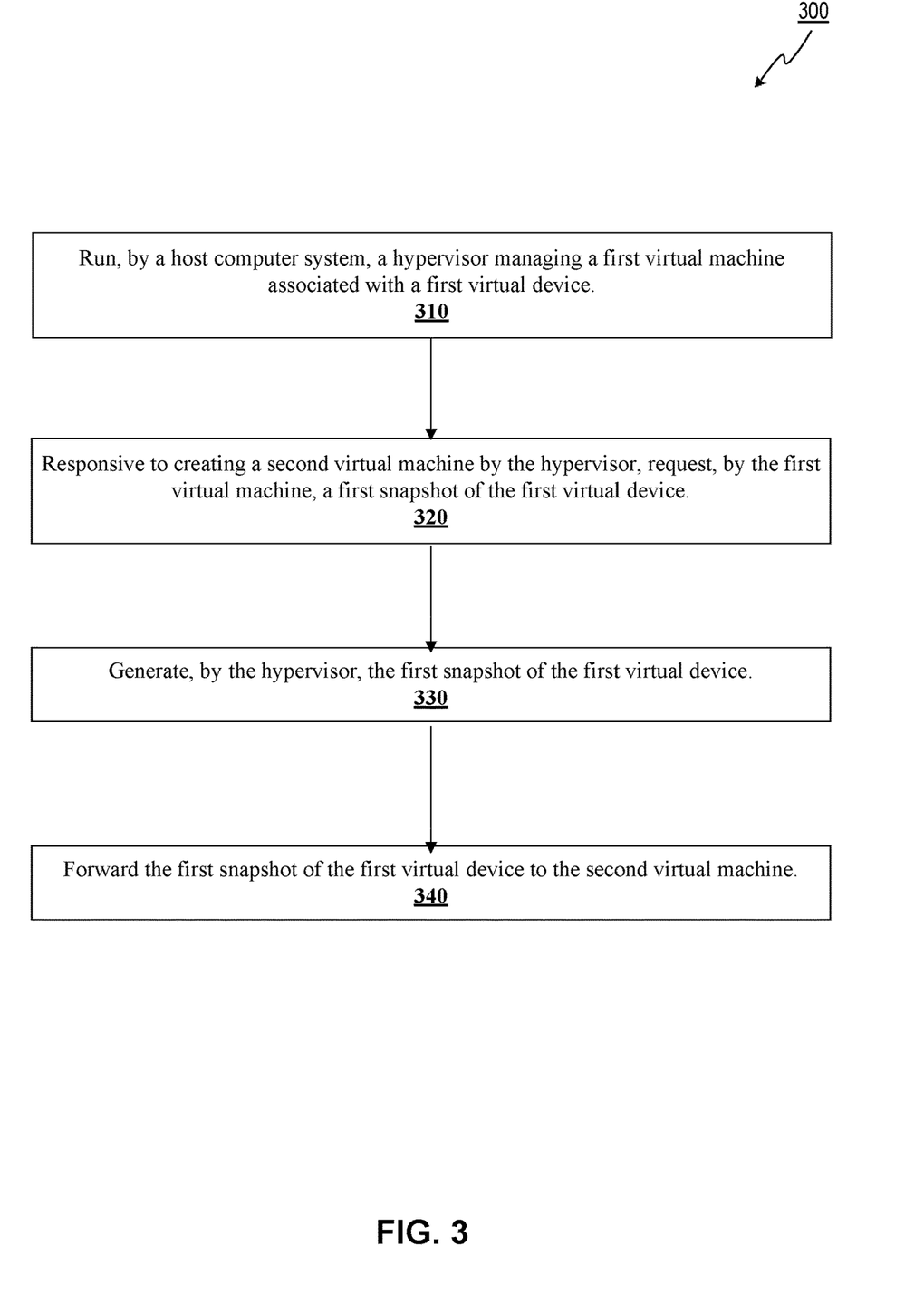
FIG. 3 depicts a flow diagram of an example method for providing storage snapshots in a nested virtualization environment, in accordance with one or more aspects of the present disclosure.

FIG. 3 depicts a flow diagram of an illustrative example of a method 300 for providing storage snapshots in a nested virtualization environment, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 310. At block 310, a host computer system may run a hypervisor managing a first virtual machine associated with a first virtual device.

At block 320, the processing device may responsive to creating a second virtual machine by the hypervisor, the first virtual machine requests a first snapshot of the first virtual device. The first virtual machine may manage the second virtual machine. The first virtual device corresponds to at least a subset of storage of a physical storage device of the host computer system.

At block 330, the processing device may generate, by the hypervisor, the first snapshot of the first virtual device. The snapshot of the first virtual device corresponds to at least a subset of storage of a physical storage device of the host computer system.

At block 340, the processing device may, forward the first snapshot of the first virtual device to the second virtual machine. As described previously, the processing device performs a pass-through of the first snapshot of virtual device to the second virtual device. Depending on the embodiment, when the first snapshot of the first virtual device is forwarded (e.g., pass through) to the second virtual machine, the processing device may create a second virtual device associated with the first snapshot of the first virtual device and assign the second virtual device to the second virtual machine. Responsive to completing the operations described herein above with references to block 340, the method may terminate.

Depending on the embodiment, the processing device responsive to receiving a write request by the second virtual machine, triggers a virtual machine exit (VMExit) to the hypervisor from the second virtual machine. As described previously, a VMExit is triggered and the second virtual machine temporarily exits to hypervisor in which the hypervisor may perform a write operation corresponding to the write request. When the write operation is performed the hypervisor may perform a virtual machine resume instructions to transfer execution control to the second virtual machine.

Figure 4:
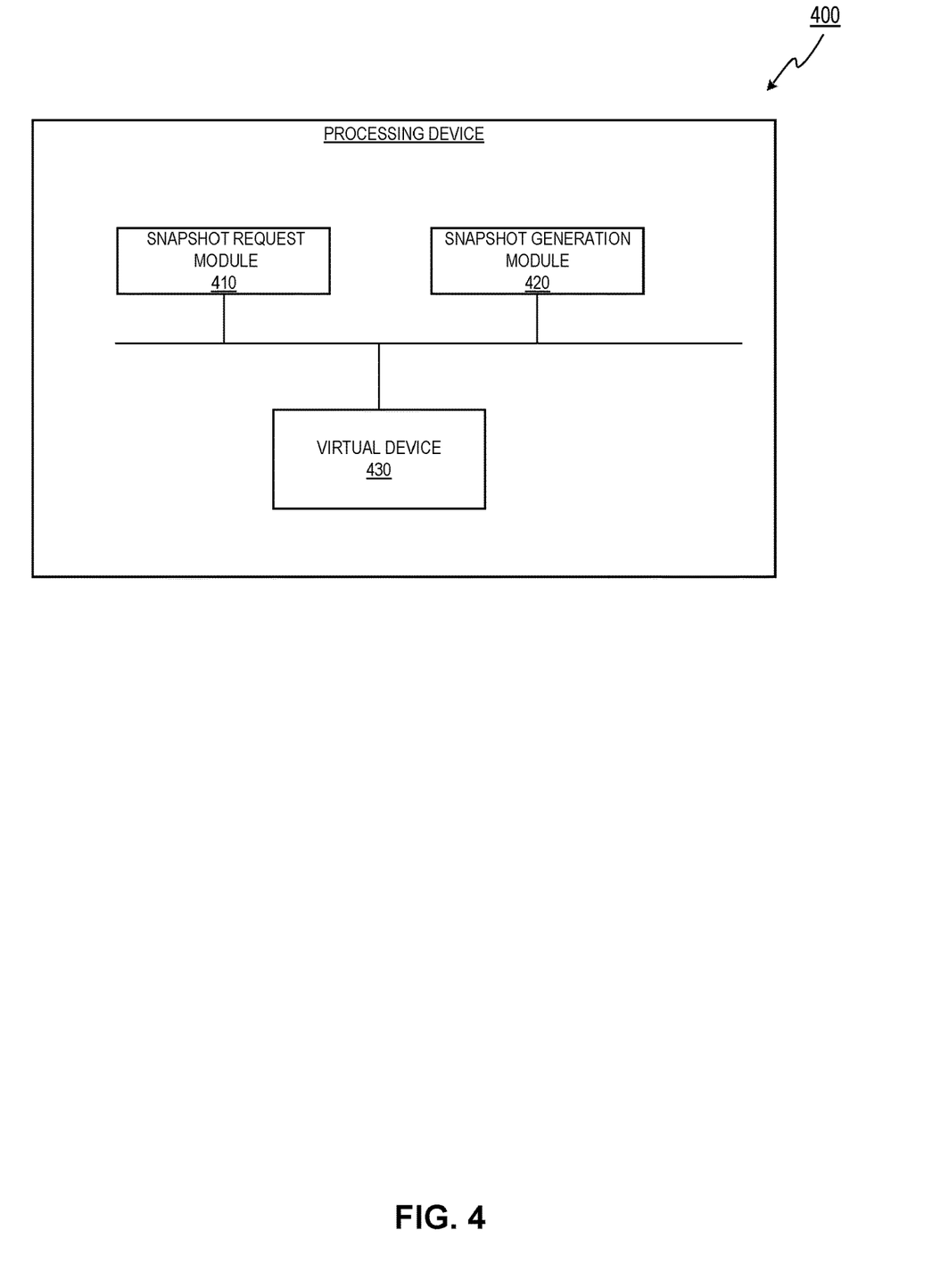
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing system 100 and may include one or more processing devices and one or more memory devices. In the example shown, computer system 400 may include a snapshot request module 410, a snapshot generation module 420, and a virtual device 430.

The processing device may run a hypervisor managing a first virtual machine associated with virtual device 430. The first virtual machine runs a second virtual machine nested in the first virtual machine. The second virtual machine is managed by the first virtual machine.

Snapshot request module 410 may request a snapshot of virtual device 430 from the hypervisor associated with the first virtual machine running the second virtual machine nested in the first virtual machine. In some embodiments, the snapshot request module 410 may request a snapshot of the virtual device 430 from the hypervisor for the first virtual machine and the second virtual machine. The snapshot request module 410 sends the request to the snapshot generation module 420. In some embodiments, the snapshot request module 420 may determine which of the first virtual machine or second virtual machine requested the snapshot.

Figure 5:
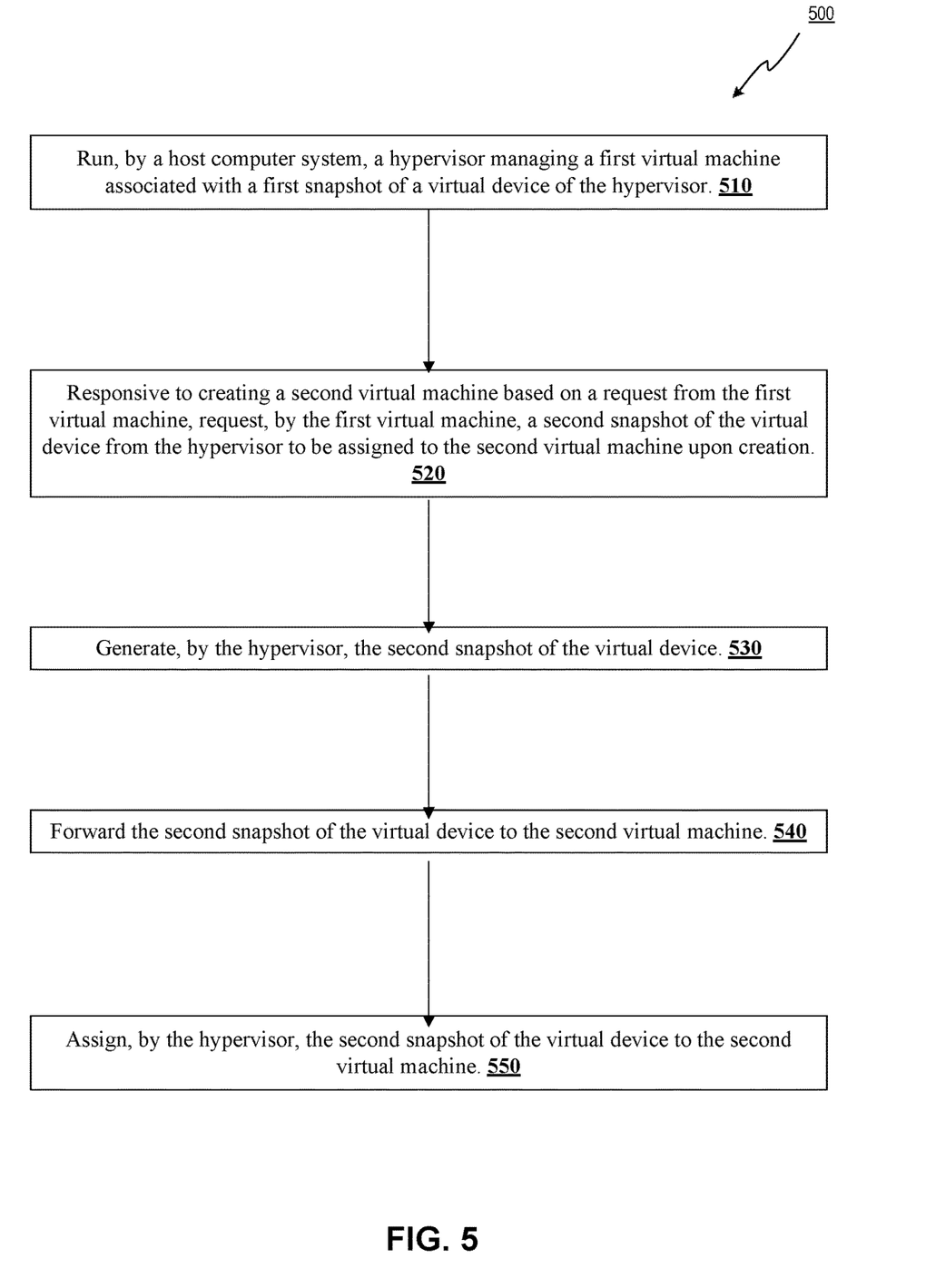
FIG. 5 depicts a flow diagram of another example method for providing storage snapshots in a nested virtualization environment, in accordance with one or more aspects of the present disclosure.

Snapshot generation module 420 may generate a snapshot of the virtual device 430 based on the received request from the snapshot request module 410. As described previously, the snapshot is a copy or a restore point of virtual device 430. In some embodiments, the snapshot generation module 420 may generate a snapshot of virtual device 430. Accordingly, as described previously, during access request (e.g., write) the snapshot generation module 420 may generate snapshots of virtual device 430 when a write operations associated with the access request is performed to prevent direct write on the virtual device 430. The snapshot generation module 420 may send the generated snapshot to the hypervisor to be sent to the second virtual machine. In some embodiments, based on which one of the first virtual machine or the second virtual machine requested the snapshot, the snapshot generation module 420 may send the first virtual machine or second virtual machine the requested the snapshot FIG. 5 depicts a flow diagram of one illustrative example of a method 500 for providing storage snapshots in a nested virtualization environment, in accordance with one or more aspects of the present disclosure. Method 500 may be similar to method 300 and may be performed in the same or a similar manner as described above in regards to method 300. Method 500 may be performed by processing devices of a server device or a client device and may begin at block 510.

At block 510, the processing device may run, by a host computer system, a hypervisor managing a first virtual machine associated with a first snapshot of a virtual device of the hypervisor. As described previously, a first snapshot of the virtual device is generated to be assigned to the virtual device of the first virtual machine. The first snapshot of the virtual device corresponds to at least a subset of storage of a physical storage device of the host computer system. In some embodiments, the snapshot interface of the hypervisor manages the first snapshot of the virtual device.

At block 520, the processing device may responsive to creating a second virtual machine based on a request from the first virtual machine, request, by the first virtual machine, a second snapshot of the virtual device from the hypervisor to be assigned to the second virtual machine upon creation. The first virtual machine may manage the second virtual machine.

At block 530, the processing device may generate, by the hypervisor, the second snapshot of the virtual device. As described previously, a second snapshot of the virtual device is generated to be assigned to the virtual device of the second virtual machine. The second snapshot of the virtual device corresponds to at least a subset of storage of a physical storage device of the host computer system. In some embodiments, the snapshot interface of the hypervisor manages the second snapshot of the virtual device.

At block 540, the processing device may forward the second snapshot of the virtual device to the second virtual machine. As described previously, the processing device performs a pass-through of the second snapshot of virtual device to the second virtual device. At block 550, the processing device may assign, by the hypervisor, the second snapshot of the virtual device to the second virtual machine.

Depending on the embodiment, the first virtual machine or the second virtual machine may receive an access request on the virtual device of the first virtual machine or the virtual device of the second virtual machine. By way of example, responsive to a request from one of the first virtual machine or the second virtual machine to perform a read operation, the corresponding first virtual machine or second virtual machine performs a read operation on the virtual device of the respective virtual machine.

Depending on the embodiment, in the event the access request is a read operation on the virtual device of the first virtual machine or the second virtual machine, the hypervisor determines which of the first virtual machine or the second virtual machine requested the write operation. By way of example, responsive to a write operations at the second virtual machine, perform a virtual machine exit (VMExit) from the second virtual machine to the hypervisor. The hypervisor performs a copy on write and returns (e.g., VMEnter) to the second virtual machine. As described previously, to perform a copy on write, the hypervisor generates a third snapshot of the virtual device to perform write operations on the third snapshot of the virtual device rather than directly on the physical storage devices. Responsive to performing the write operation on the third snapshot of the virtual device When the write operations is performed the third snapshot of the virtual device is forwarded (e.g., pass through) to the second virtual machine. The third snapshot of the virtual device is assigned (e.g., replacing the second snapshot of the virtual device) to the second virtual machine. Responsive to completing the operations described herein above with references to block 550, the method may terminate.

Figure 6:
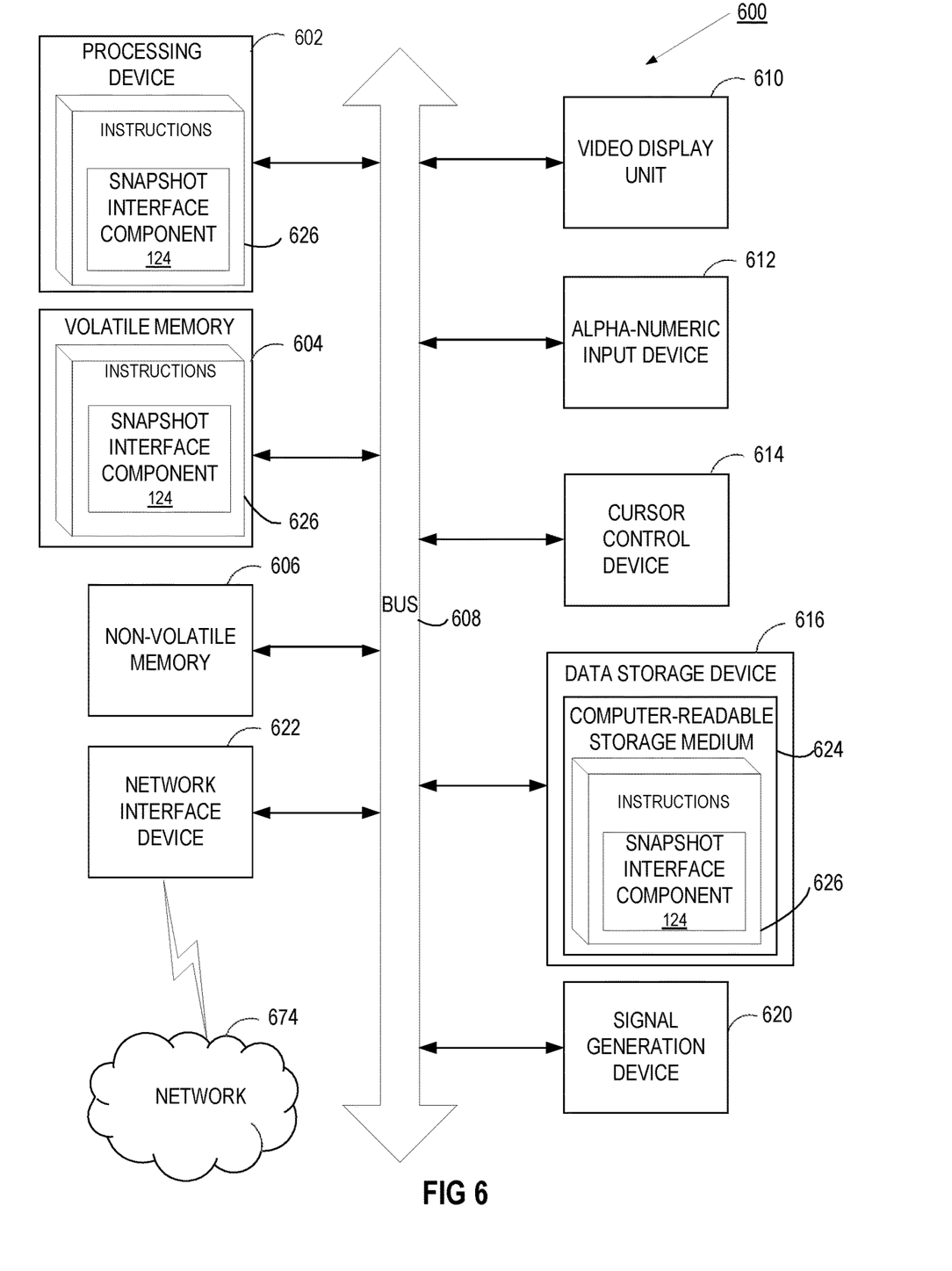
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for I/O translation table generating component 122 and components illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
running, by a host computer system, a hypervisor managing a first virtual machine associated with a first virtual device;
responsive to creating a second virtual machine by the hypervisor, requesting, by the first virtual machine, a first snapshot of the first virtual device, wherein the second virtual machine is nested within the first virtual machine;
generating, by the hypervisor, the first snapshot of the first virtual device; and
forwarding the first snapshot of the first virtual device to the second virtual machine;
creating a second virtual device associated with the first snapshot of the first virtual machine;
assigning the second virtual device to the second virtual machine;
accessing, by the second virtual machine, the second virtual device via accessing the first snapshot.

2. The method of claim 1, further comprising:
responsive to receiving a write request by the second virtual machine, triggering, by the hypervisor, a virtual machine exit (VMExit) from the second virtual machine to the hypervisor; and
performing, by the hypervisor, a write operation corresponding to the write request.

3. The method of claim 2, further comprising:
responsive to performing the write operation, performing, by the hypervisor, a virtual machine resume instruction to transfer execution control to the second virtual machine.

4. The method of claim 1, wherein the first snapshot of the first virtual device corresponds to at least a subset of storage of a physical storage device of the host computer system.

5. The method of claim 1, wherein the first virtual machine manages the second virtual machine.

6. The method of claim 1, wherein the hypervisor comprises a snapshot interface to manage the first virtual device, the first snapshot of the first virtual device, and subsequent snapshots of the first virtual device.

7. A system comprising:
a memory device;
a processing device, operatively coupled to the memory device, to perform operations comprising:
running, by a host computer system, a hypervisor managing a first virtual machine associated with a first virtual device;
responsive to creating a second virtual machine by the hypervisor, requesting, by the first virtual machine, a first snapshot of the first virtual device;
generating, by the hypervisor, the first snapshot of the first virtual device; and
forwarding the first snapshot of the first virtual device to the second virtual machine;
creating a second virtual device associated with the first snapshot of the first virtual machine;
assigning the second virtual device to the second virtual machine;
accessing, by the second virtual machine, the second virtual device via accessing the first snapshot.

8. The system of claim 7, wherein the operations further comprise:
responsive to receiving a write request by the second virtual machine, triggering, by the hypervisor, a virtual machine exit (VMExit) to the hypervisor from the second virtual machine; and
performing, by the hypervisor, a write operation corresponding to the write request.

9. The system of claim 8, wherein the operations further comprise:
responsive to performing the write operation, performing, by the hypervisor, a virtual machine resume instruction to transfer execution control to the second virtual machine.

10. The system of claim 7, wherein first snapshot of the first virtual device corresponds to at least a subset of storage of a physical storage device of the host computer system.

11. The system of claim 7, wherein the first virtual machine manages the second virtual machine.

12. The system of claim 7, wherein the hypervisor comprises a snapshot interface to manage the first virtual device, the first snapshot of the first virtual device, and subsequent snapshots of the first virtual device.

13. A non-transitory machine-readable storage medium including instructions that, when accessed by a processing device, cause the processing device to:
run, by a host computer system, a hypervisor managing a first virtual machine associated with a first snapshot of a first virtual device of the hypervisor;
responsive to creating a second virtual machine based on a request from the first virtual machine, request, by the first virtual machine, a second snapshot of the first virtual device from the hypervisor to be assigned to the second virtual machine upon creation, wherein the second virtual machine is nested within the first virtual machine;
generate, by the hypervisor, the second snapshot of the first virtual device;
forward the second snapshot of the first virtual device to the second virtual machine; and
assign, by the hypervisor, the second snapshot of the first virtual device to the second virtual machine,
accessing, by the second virtual machine, an associated virtual device of the second virtual machine via accessing the second snapshot of the first virtual device.

14. The non-transitory machine-readable storage medium of claim 13, further causing the processing device to:
responsive to receiving a request from one of the first virtual machine or the second virtual machine to perform a read operation, perform a read operation on the first virtual device.

15. The non-transitory machine-readable storage medium of claim 13, further causing the processing device to:
responsive to receiving a request from one of the first virtual machine or the second virtual machine to perform a write operation, determine which of the first virtual machine or the second virtual machine requested the write operation.

16. The non-transitory machine-readable storage medium of claim 15, further causing the processing device to:
responsive to receiving a write operations at the second virtual machine, perform a virtual machine exit (VMExit) from the second virtual machine to the hypervisor;
generate, by the hypervisor, a third snapshot of the first virtual device;
perform a write operation on the third snapshot of the first virtual device;
forward the third snapshot of the first virtual device to the second virtual machine; and
assign the third snapshot of the first virtual device to the second virtual machine.

17. The non-transitory machine-readable storage medium of claim 13, wherein the first virtual machine manages the second virtual machine.

18. The non-transitory machine-readable storage medium of claim 16, wherein the hypervisor comprises a snapshot interface to manage the first snapshot of the first virtual device, the second snapshot of the first virtual device, and the third snapshot of the first virtual device.

* * * * *

UNITED STATES PATENT AND TRADEMARK OFFICE
CERTIFICATE OF CORRECTION

PATENT NO. : 11,983,555 B2  
APPLICATION NO. : 17/444372  
DATED : May 14, 2024  
INVENTOR(S) : Michael Tsirkin et al.

Page 1 of 1

It is certified that error appears in the above-identified patent and that said Letters Patent is hereby corrected as shown below:

In the Specification

In Column 6, Line 61, please replace "Hypervisor 210 may processes" with -- Hypervisor 210 may process --.

In Column 7, Line 2, please replace "Hypervisor 210 may processes" with -- Hypervisor 210 may process --.

In Column 7, Line 6, please replace "snapshots of the a virtual device" with -- snapshots of the virtual device --.

In Column 7, Line 12, please replace "Level 2 VM 260 as performed" with -- Level 2 VM 260 has performed --.

In Column 8, Line 11, please replace "device may responsive to" with -- device may be responsive to --.

In Column 9, Line 41, please replace "processing device may responsive" with -- processing device may be responsive --.

Signed and Sealed this  
Sixth Day of May, 2025

Coke Morgan Stewart  
*Acting Director of the United States Patent and Trademark Office*